United States Patent [19]

Coon, Jr.

[11] 3,949,706

[45] Apr. 13, 1976

[54] COMBINED HAY CARRIER AND FEEDER

[76] Inventor: William G. Coon, Jr., P.O. Box 196, Spickard, Mo. 64679

[22] Filed: Nov. 15, 1974

[21] Appl. No.: 524,042

[52] U.S. Cl. .................. 119/60; 119/58; 214/131 R; 214/390; 214/501

[51] Int. Cl.$^{2}$ .................. A01K 5/00

[58] Field of Search ........... 214/350, 351, 352, 501, 214/390, 131 R, 144; 119/20, 58, 60

[56] References Cited

UNITED STATES PATENTS

| | | | |
|---|---|---|---|
| 2,468,297 | 4/1949 | Jones | 214/352 |
| 2,616,580 | 11/1952 | Olson | 214/131 |
| 3,101,153 | 8/1963 | Verdery | 214/390 |
| 3,336,908 | 8/1967 | Swanson | 119/60 |
| 3,892,202 | 7/1975 | Feterl | 119/60 |

*Primary Examiner*—Robert G. Sheridan
*Attorney, Agent, or Firm*—Lowe, Kokjer, Kircher, Wharton & Bowman

[57] ABSTRACT

Apparatus for loading, transporting and feeding large hay bales and hay stacks. An open bottomed trailer includes a frame mounted on a wheel assembly. Four panels mounted on the frame comprise a plurality of spaced bars. A pivotal lift supported within the panels includes a pair of pivotally supported forks and a hydraulic cylinder to pivot the forks and to lift a hay bale or stack supported thereon. In feeding, the lift is lowered and animals are allowed to feed on the hay through the barred panels.

4 Claims, 3 Drawing Figures

COMBINED HAY CARRIER AND FEEDER

BACKGROUND AND SUMMARY OF THE INVENTION

This invention relates generally to the handling of hay and more particularly to apparatus which loads and transports large hay bales and hay stacks and also serves as a feeding rack.

The recent trend among farmers and ranchers has been to feed animals from extremely large hay bales which are formed in a generally cylindrical configuration by a special baling machine. The bales are several feet in diameter and typically weigh hundreds of pounds. Consequently, difficult handling problems have arisen in transporting the bales from the field to the feeding pen.

Since manual handling is virtually precluded because of the size and weight of the large bales, specialized equipment of various types has been developed to facilitate the handling and transporting of the bales. However, this equipment is generally unsatisfactory due to the complex and expensive machinery incorporated therein. Existing equipment is further characterized by awkwardness and stability problems in transporting the heavy bales, and by safety problems in loading and unloading the bales. Moreover, most hay handling equipment is suited for use only with bales that are within a relatively narrow size range and is unable to handle other types of hay masses such as hay stacks. This lack of versatility is a serious drawback because the large hay bales are not of uniform size and it is often necessary to move hay stacks from place to place.

Another problem has resulted from the existing practice of feeding animals from large bales that are disposed in an open area of the feeding pen. Animals feeding from hay located on the ground ruin a substantial quantity of the hay by trampling and polluting it. Once polluted, the hay is completely wasted since the animals will not consume it. For this reason, ranchers have employed hay racks and bunks when feeding the small, conventional style hay bales. However, the handling difficulties associated with the extreme size and weight of the large bales and stacks preclude use of the normal hay racks and bunks available to stockmen.

In view of the aforementioned deficiencies in existing hay handling equipment, there is a need among farmers and ranchers for improved apparatus to handle large hay bales and hay stacks. It is a primary goal of this invention to meet that need.

More specifically, it is an important object of the present invention to provide improved apparatus for loading and transporting large masses of hay. It is a significant feature of the invention that the hay is automatically loaded and unloaded safely and quickly, and can be accomplished by a single man.

A further important object of the invention is to provide apparatus of the character described that also functions as a feeder. The provision of a hay carrier that serves additionally as a feeder is a unique achievement that eliminates the necessity of unloading the hay in a separate hay rack or bunk and permits the feeder to be located at any desired position.

Another object of the invention is to provide apparatus of the character described which is suited for handling both hay bales and hay stacks of large sizes and which is adapted to handle bales and stacks of various shapes and configurations.

Still another object of the invention is to provide apparatus of the character described that firmly supports the hay in a stable position during transport. It is an important feature of the invention that the hay is carried at a relatively low elevation on a sturdy lift to thereby minimize any stability problems and any tendency of the hay to fall off of the lift.

A further object of the invention is to provide apparatus of the character described which is operated safely and without manual effort by the single operator.

A still further object of the invention is to provide apparatus of the character described that is constructed ruggedly yet economically.

Other and further objects of the invention, together with the features of novelty appurtenant thereto, will appear in the course of the following description.

DETAILED DESCRIPTION OF THE INVENTION

In the accompanying drawing, which forms a part of the specification and is to be read in conjunction therewith, and in which like reference numerals are employed to indicate like parts in the various views.

Figure 1:
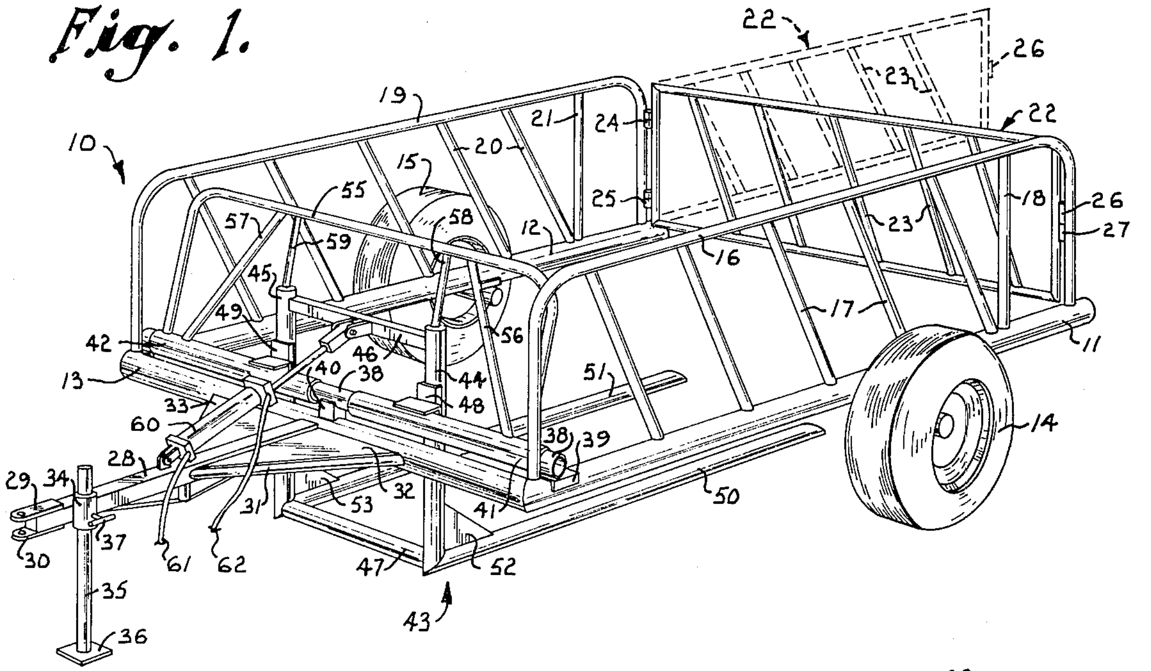
FIG. 1 is a perspective view of apparatus embodying the invention, with the lift thereof shown in its lowered position and the broken line view showing the hinged rear gate in its open position.

Referring now to the drawing in detail, apparatus embodying a combined hay carrier and feeder includes an open bottomed trailer which is generally designated by reference numeral 10. With initial reference to FIG. 1, the frame of trailer 10 includes a pair of tubular structural bars 11 and 12. Bars 11 and 12 are disposed horizontally and are spaced apart in parallel relation on opposite sides of trailer 10. The length of bars 11 and 12 and the width defined therebetween are greater than the corresponding dimensions of the large bales and stacks of hay that are handled by the apparatus. An additional tubular bar 13 rigidly interconnects bars 11 and 12 at their forward ends and is oriented at 90° to the latter bars. Trailer 10 is suitably mounted on a pair of ground engaging wheels 14 and 15. The wheels 14 and 15 are conventionally secured to the respective bars 11 and 12 to support the trailer frame above the ground.

A left side panel comprising a plurality of interconnected bars is supported on bar 11 in an upright disposition. A horizontal upper bar 16 forms the top edge of the panel and has vertical opposite end portions which are bent downwardly and welded at their bottom ends to the respective opposite ends of bar 11. A plurality of slanted bars 17 extend between bar 11 at their lower ends and bar 16 at their top ends. Bars 17 are angled with respect to vertical and are spaced from one another a distance sufficient to permit animals to extend their heads therebetween. An upright bar 18 interconnects bars 11 and 16 at a location behind wheel 14 to provide additional strength.

The opposite or right side panel is constructed identically and supported on bar 12 in an upright disposition. A horizontal upper bar 19 forms the top edge of the panel and has vertical opposite end portions which are bent downwardly and welded at their bottom ends to the respective opposite ends of bar 12. A plurality of inclined bars 20 extend between bars 12 at their lower ends and bar 19 at their top ends. Bars 20 are angled with respect to vertical and spaced from one another a distance sufficient to permit animals to extend their heads therebetween. An upright bar 21 interconnects bars 12 and 19 at a location behind wheel 15 to provide additional strength.

A hingedly mounted rear gate 22 comprising a plurality of bars normally extends between the opposite side panels at the rear edges thereof. The rectangular border of rear gate 22 is formed from pairs of spaced horizontal and vertical bars which are interconnected at right angles. A plurality of inclined bars 23 extend between the upper and lower horizontal bars of the rear gate. Bars 23 are angled with respect to vertical and are spaced sufficiently to permit animals to extend their heads therebetween. A pair of conventional hinge couplings 24 and 25 couple one end of rear gate 22 to the extreme back end of the right side panel and permit rear gate 22 to open and close about a vertical hinge axis. Rear gate 22 and the left side panel are provided with respective pipe sections 26 and 27 which vertically align when gate 22 is closed. A pin or the like (not shown) is removably inserted through the aligned bores of pipe sections 26 and 27 to latch rear gate 22 in a closed position when desired.

To provide a means for towing trailer 10, a rectangular bar 28 extends forwardly from connection to a central portion of bar 13. The forward end of bar 28 is provided with a pair of vertically spaced ear plates 29 and 30 which are apertured in order to be pinned to the hitch of a towing vehicle such as a tractor (not shown). A pair of bars (one of which is indicated at 31) angle between bars 13 and 28 to strengthen the connection therebetween, while a pair of gusset plates 32 and 33 add further reinforcement. A vertical sleeve 34 is secured to one side of bar 28 near the forward end thereof to receive an extendable and rectractable leg 35. A rectangular pad 36 is carried on the bottom of leg 35 to provide stable engagement with the ground. A set screw 37 having a large handle extends through sleeve 34 and may be tightened against leg 35 to fix the leg in position relative to the sleeve.

A cylindrical pipe or bar 38 is secured at its opposite ends to pads (one of which is indicated at 39) that are welded to the tops of the respective frame bars 11 and 12 near the forward ends thereof. Bar 38 is disposed slightly upwardly and rearwardly from bar 13 and is connected thereto by a block 40 which is welded between central portions of bars 13 and 38. Bar 38 receives a pair of tubular sleeves 41 and 42 which are spaced on opposite sides of block 40 and are rotatable about the axis of bar 38.

A fork-like lift, which is generally designated by reference numeral 43, is supported on sleeves 41 and 42 for pivotal movement about bar 38. Lift 43 includes a pair of spaced, vertical bars 44 and 45 which are interconnected at their top and bottom ends by respective horizontal bars 46 and 47. Bars 44 and 45 are rigidly secured at intermediate portions thereof to respective brackets 48 and 49 which are in turn rigidly connected to intermediate portions of the respective sleeves 41 and 42. A pair of spaced, horizontal forks 50 and 51 are rigidly connected to the bottom ends of the respective vertical bars 44 and 45, with gusset plates 52 and 53 reinforcing the connection. Forks 50 and 51 are spaced from one another less than the size of the large hay bales and stacks that are handled by the apparatus, while the forks are of a length to extend beneath a major portion of the bales and stacks. Forks 50 and 51 are normally spaced closely above the ground and are beveled downwardly at their outer ends to provide pointed tips that facilitate their receipt beneath the bales and stacks.

Trailer 10 includes a front panel that is supported on sleeves 41 and 42 to cooperate with lift 43 in supporting raised hay bales and stacks. A horizontal upper bar 55 forms the top edge of the front panel and includes opposite end portions that are bent downwardly and welded at their bottom ends to the respective sleeves 41 and 42. A pair of inclined bars 56 and 57 extend upwardly at an angle from the respective sleeves 41 and 42 to connection at their top ends with bar 55. A pair of shorter bars 58 and 59 that are substantially upright extend from the tops of the respective vertical bars 44 and 45 to connection at their top ends with bar 55. The front panel is normally inclined slightly to the rear, although it pivots forwardly as lift 43 is pivoted upwardly to raise a hay bale or stack.

A conventional hydraulic cylinder 60 is provided to pivot lift 43 upwardly and downwardly about bar 38. One end of cylinder 60 is pivotally pinned to an ear plate mounted on top of bar 28, while the end of its piston rod is pivotally pinned between a pair of ear plates secured to a central portion of bar 46. Suitable fluid lines 61 and 62 connect cylinder 60 to a hydraulic fluid source (not shown) which is preferably carried on the towing vehicle.

Figure 2:
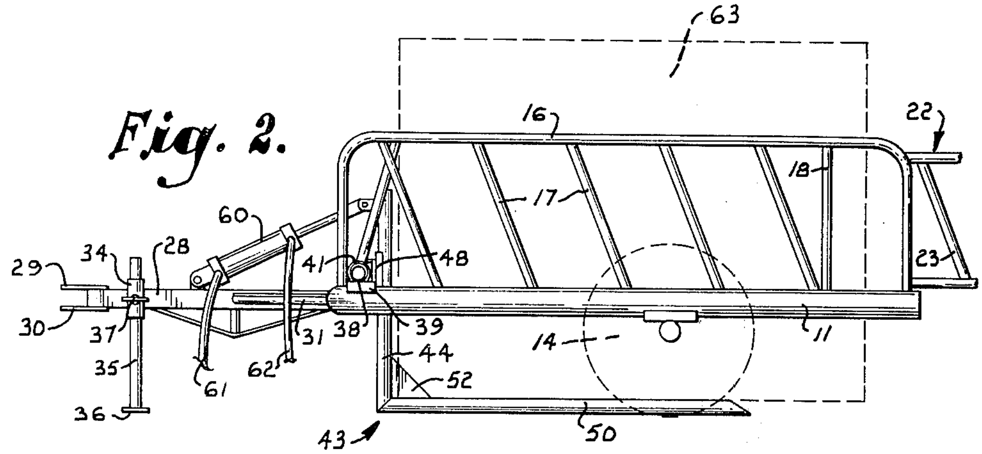
FIG. 2 is a side elevational view of the apparatus shown in FIG. 1 and illustrating the lift thereof positioned beneath a large hay bale which is shown in broken lines, the hinged rear gate being shown in its open position.
Figure 3:
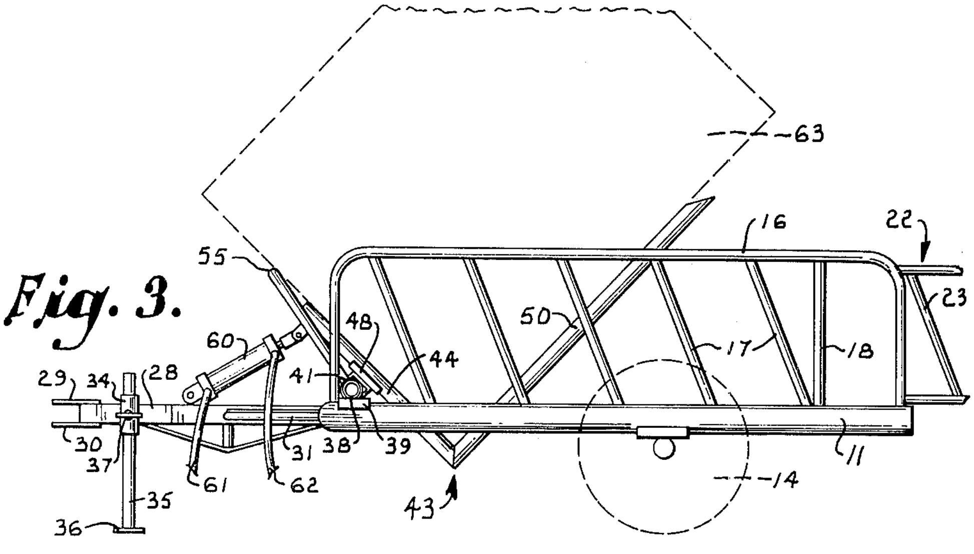
FIG. 3 is a side elevational view similar to FIG. 2, but with the lift pivoted upwardly to raise the large hay bale above the ground for transport.

In operation, the apparatus is used to load large hay bales and hay stacks standing in the field and to transport the hay to a desirable area for feeding animals. Trailer 10 is coupled to a tractor or other towing vehicle by pinning plates 29 and 30 to the tractor hitch. Leg 35 is moved upwardly and held in an upward or retracted position by set screw 37. With rear gate 22 in its completely open position, the tractor is backed to move trailer 10 toward a large hay bale, which is shown in broken lines in FIGS. 2 and 3 and designated by reference numeral 63. As trailer 10 approaches bale 63, forks 50 and 51 are received beneath the bale with the insertion of the forks being facilitated by their beveled ends. After forks 50 and 51 have been completely backed beneath bale 63 as shown in FIG. 2, cylinder 60 is actuated to retract its piston rod and thereby pivot lift 43 upwardly about the axis of bar 38. When the piston rod is completely retracted as shown in FIG. 3, forks 50 and 51 are inclined upwardly at approximately 45°, and the weight of the bale 63 is supported on the forks and on the vertical bars 44 and 45, with further support being provided by the bars of the front trailer panel. It is noted that the raised bale is carried on lift 43 at a relatively low position so that maximum stability is attained during transport.

Rear gate 22 is thereafter closed and latched during the transport of trailer 10 to a feeding pen or other feeding area. When the feeding area is reached, cylinder 60 is actuated to extend its piston rod and thereby pivot lift 43 downwardly to the position of FIG. 2. Leg 35 is then lowered and held in its extended position by set screw 37 to support the front end of trailer 10 and permit the tractor to be uncoupled and driven off. Since bale 63 is contained within the enclosed area defined by the barred trailer panels, animals are permitted ready access to feed on the hay through the panel bars, while the bars prevent the animals from polluting or trampling the hay. The apparatus is equally well suited for use with a large hay stack, and its operation in handling and feeding a hay stack is substantially the same as that described in connection with a hay bale.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for loading and transporting a large mass of hay and for feeding animals from said hay mass, said apparatus comprising:

a frame open at the bottom and having a greater size than said hay mass;

a ground engaging wheel assembly supporting said frame above the ground;

means adapted to couple said frame to a vehicle for towing thereby;

a plurality of panels supported on said frame, said panels including a plurality of bars spaced apart to permit the heads of animals to fit therebetween;

a gate supported on said frame and cooperating with said panels to define an enclosure for confining said hay mass, said gate being selectively movable to present an opening in said enclosure of a size to receive said hay mass;

a lift supported for pivotal movement on said frame and located within said enclosure at a position to supportively receive said hay mass, said lift being pivotal upwardly to raise said hay mass from the ground and support said hay mass above the ground for transport, one of said panels being connected to said lift and supported for pivotal movement therewith to assist in supporting said hay mass above the ground; and power means for moving said lift to raise said hay mass from the ground to an elevated position and to lower same to the ground from the elevated position.

2. Apparatus as set forth in claim 1, wherein said lift includes a support member pivotally hinged to the frame for movement about a substantially horizontal axis disposed above the ground, and a pair of hay engaging forks secured to said support member and spaced closely above the ground to be received beneath the hay mass, said power means being operable to pivot said lift upwardly about said axis to raise said hay mass from the ground with said one panel, support member and forks cooperating to support said hay mass above the ground for transport.

3. Apparatus as set forth in claim 2, wherein said support member has top and bottom ends and is pivotally hinged to said frame intermediately of its top and bottom ends, said forks extending generally rearwardly from said bottom end, and said power means being connected to said support member above said axis to pivot said lift.

4. Apparatus as set forth in claim 2, wherein said lift is pivotal through an arc sufficient to carry said forks between a position substantially horizontal for receiving said hay mass and a position inclined approximately 45° from horizontal when said hay mass is raised above the ground.

* * * * *